United States Patent
Takayanagi et al.

(10) Patent No.: US 7,057,841 B2
(45) Date of Patent: Jun. 6, 2006

(54) MAGNETIC DISK DRIVE

(75) Inventors: Kenji Takayanagi, Nagaokakyo (JP); Hideki Shirokoshi, Nagaokakyo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/744,136

(22) Filed: Dec. 24, 2003

(65) Prior Publication Data
US 2004/0190186 A1 Sep. 30, 2004

(30) Foreign Application Priority Data
Dec. 26, 2002 (JP) .............................. 2002-377884

(51) Int. Cl.
*G11B 21/02* (2006.01)
(52) U.S. Cl. ........................................ 360/75; 360/69
(58) Field of Classification Search ............... 360/69, 360/75, 73.03, 78.01, 78.04, 78.12, 72.1; 318/563, 368, 561
See application file for complete search history.

(56) References Cited

U.S. PATENT DOCUMENTS 6,025,968 A * 2/2000 Albrecht ..................... 360/75
6,549,359 B1 * 4/2003 Bennett et al. .............. 360/69

FOREIGN PATENT DOCUMENTS

| JP | 09-213035 | 8/1997 |
| JP | 2000-306380 A | 11/2000 |
| JP | 2001-307408 A | 11/2001 |

* cited by examiner

*Primary Examiner*—David Hudspeth
*Assistant Examiner*—Jason Olson
(74) *Attorney, Agent, or Firm*—McDermott Will & Emery LLP

(57) ABSTRACT

A magnetic disk drive drives a switch and supplies induced power of a motor to an actuator to retract a magnetic head, if a power supply voltage is judged as being below a predetermined level. The switch is driven using an output voltage of a step-up circuit. The step-up circuit operates from before the power supply voltage drops below the predetermined level, so that the switch can be driven immediately. This makes it possible to efficiently supply the induced power to the actuator.

9 Claims, 12 Drawing Sheets

MAGNETIC DISK DRIVE

This application is based on an application No. 2002-377884 filed in Japan, the contents of which are hereby incorporated by reference.

BACKGROUND OF THE INVENTION

1. Field of the Invention

The present invention relates to a magnetic disk drive. The invention in particular relates to an automatic head retract mechanism of immediately retracting a magnetic head, when the magnetic disk drive becomes unable to receive power from a power supply due to a power failure or the like during operation. 2. Related Art A magnetic disk drive can become unable to receive power from a power supply unexpectedly when, for example, a malfunction is caused by a user or a power failure occurs during operation. When this happens, a magnetic head should be retracted away from a magnetic disk immediately, to prevent the magnetic head from touching the magnetic disk. To retract the magnetic head, power needs to be supplied to an actuator for driving the magnetic head. However, such power cannot be drawn from the power supply.

Unexamined Japanese Patent Application Publication No. 2001-307408 discloses a technique of supplying induced power generated in a motor which rotates a magnetic disk, to an actuator to retract a magnetic head. The magnetic disk keeps rotating by an inertial force for awhile after power from a power supply stops. This makes the motor function as a power generator. The above technique exploits this property.

FIG. 1 shows a construction of a magnetic disk drive disclosed by Unexamined Japanese Patent Application Publication No. 2001-307408.

A spindle motor 51 is a three-phase AC (alternating current) motor for rotating a magnetic disk. A SPM drive circuit 52 supplies driving power to the spindle motor 51.

A voice coil motor 76 is an actuator for driving a magnetic head. The voice coil motor 76 is supplied with power from a VCM drive circuit 71 during a normal operation period (i.e. when the magnetic disk drive receives power from a power supply normally), and from the spindle motor 51 during a retraction period (i.e. when the magnetic disk drive cannot receive power from the power supply and the magnetic head needs to be retracted). A switch circuit 53 controls switches 78 and 79, to switch between the VCM drive circuit 71 and the spindle motor 51.

A rectification circuit 75 rectifies three-phase AC induced power generated in the spindle motor 51. A control circuit 77 controls switches included in the rectification circuit 75.

A voltage in each phase of the induced power has a near-sinusoidal waveform. These three phases differ by an electrical angle of 120°. In other words, a phase having a highest voltage out of the three phases differs with time. For efficient rectification, a maximum detection circuit 72 controls switches 65, 66, and 67 so that only a switch corresponding to a highest-voltage phase of the induced power is closed. Meanwhile, a minimum detection circuit 73 controls switches 68, 69, and 70 so that only a switch corresponding to a lowest-voltage phase of the induced power is closed.

In this way, the magnetic disk drive rectifies the induced power generated in the spindle motor 51 and supplies the rectified power to the voice coil motor 76.

In recent years, magnetic disk drives are becoming increasingly smaller. In keeping with this trend, semiconductor chips on which the above circuits are integrated need to be downsized too. In the case of FIG. 1, integrating the switches 78 and 79 in a semiconductor chip requires two pairs of power transistors, i.e., a total of four power transistors. A power transistor handles a large amount of current and therefore has a large volume. Hence it is desirable to use fewer power transistors to realize a smaller semiconductor chip. In view of this, the inventors of the present application considered the following construction in the process of development.

FIG. 2 shows a construction of a magnetic disk drive considered by the inventors of the present application.

In the drawing, an output terminal 58 of the rectification circuit 75 is connected to a power input terminal of the VCM drive circuit 71, and a switch 57 is provided between the terminal 58 and a power supply.

The switch 57 is closed during the normal operation period, and opened during the retraction period. In so doing, power is supplied to the VCM drive circuit 71 both during the normal operation period and the retraction period. This construction enables the number of power transistors used for power source switching to be reduced to one (i.e. the switch 57).

This magnetic disk drive serves the need for a smaller semiconductor chip. When the magnetic disk drive is put to use, however, the following new problem arises.

The maximum detection circuit 72 operates to control the switches 65 to 67 only in the retraction period, and does not operate in the normal operation period. This is because if the maximum detection circuit 72 closes any of the switches 65 to 67 during the normal operation period, a DC voltage of the power supply reaches the spindle motor 51, thereby interfering with the operation of the spindle motor 51.

In the retraction period, the maximum detection circuit 72 uses the induced power generated in the spindle motor 51, to control the switches 65 to 67. In general, a voltage of induced power is relatively low. Therefore, the maximum detection circuit 72 steps-up the voltage of the induced power and uses the stepped-up voltage to control the switches 65 to 67, to bring one of the switches 65 to 67 into full conduction.

To step-up the induced power, however, it is first necessary to charge a capacitor in the maximum detection circuit 72. This means the maximum detection circuit 72 cannot immediately obtain a sufficiently stepped-up voltage to control the switches 65 to 67 when the retraction period begins. Due to the recent trend toward smaller magnetic disk drives, induced power tends to be smaller. Under such circumstances, it is difficult to design magnetic disk drives that can reliably retract a magnetic head upon a power failure or the like.

SUMMARY OF THE INVENTION

The present invention aims to provide techniques of reliably retracing a magnetic head using low induced power in smaller magnetic disk drives.

The stated aim can be achieved by a magnetic disk drive having an automatic head retract mechanism, including: a judgment circuit operable to judge whether a power supply voltage is below a predetermined level; a switch inserted in a connecting line between a coil of a motor for rotating a magnetic disk and a power terminal of an actuator for driving a magnetic head, and closed or opened depending on a voltage applied to a control terminal thereof; a step-up circuit operable to step-up a voltage of power supplied to the actuator; and a switch control unit operable to, when the judgment circuit judges that the power supply voltage is below the predetermined level, close the switch by applying the stepped-up voltage to the control terminal of the switch, to supply induced power generated in the motor to the actuator.

According to this construction, the step-up circuit has already stepped-up the voltage of the power supplied to the actuator, by the time the power supply voltage drops below the predetermined level. Here, "the voltage of the power supplied to the actuator" refers to the power supply voltage if the power supply voltage is equal to or above the predetermined level, and the voltage of the induced power if the power supply voltage is below the predetermined level.

In this way, the magnetic disk drive can control the switch using the stepped-up voltage, as soon as the power supply voltage drops below the predetermined level. Hence the induced power can be efficiently supplied to the actuator. Thus, the magnetic disk drive can successfully retract the magnetic head with low induced power.

Here, the step-up circuit may include: a capacitor including a first electrode and a second electrode; a clock generation circuit operable to generate a clock signal that alternates between a high level and a low level at regular intervals, and output the clock signal to the first electrode; and a step-up control circuit operable to apply the voltage of the power supplied to the actuator to the second electrode when the clock signal is the low level, and output a voltage from the second electrode when the clock signal is the high level.

According to this construction, the magnetic disk drive uses a step-up charge pump circuit.

Suppose the high level of the clock signal represents the voltage supplied to the actuator and the low level of the clock signal represents a ground voltage. Then the step-up circuit generates approximately double the voltage supplied to the actuator. In such a case, when a voltage of about 5V is needed to produce full conduction of the switch, the magnetic disk drive can efficiently supply the induced power to the actuator unless the induced power drops to about 2.5V. Thus, the magnetic disk drive can reliably retract the magnetic head with low induced power.

Here, the clock generation circuit may be a ring oscillator formed by a predetermined number of cascaded inverters, the predetermined number being an odd number no less than 3, where an output voltage of a last inverter is output as the clock signal and also input to a first inverter as an input voltage.

According to this construction, the step-up circuit employs a ring oscillator as the clock generation circuit. A ring oscillator has a very simple circuit construction and does no require a bias circuit, so that a clock signal can be stably generated even with an extremely low voltage (e.g. below 1V).

Accordingly, the step-up circuit can operate stably with low induced power.

Here, the switch may be a MOS transistor, with a source connected to the coil of the motor and a drain connected to the power terminal of the actuator, wherein the switch control unit (a) applies the stepped-up voltage to a gate of the MOS transistor to produce conduction between the source and the drain when the judgment circuit judges that the power supply voltage is below the predetermined level, and (b) refrains from applying the stepped-up voltage to the gate of the MOS transistor to prevent conduction between the source and the drain when the judgment circuit judges that the power supply voltage is equal to or above the predetermined level.

According to this construction, the switch can be integrated in a semiconductor chip in a smaller size, and lower power consumption can be achieved.

The stated aim can also be achieved by a magnetic disk drive having an automatic head retract mechanism, including: a judgment circuit operable to judge whether a voltage of a power supply is below a predetermined level; a switch inserted in a connecting line between a coil of a motor for rotating a magnetic disk and a power terminal of an actuator for driving a magnetic head; and a switch control unit operable to, when the judgment circuit judges that the voltage of the power supply is below the predetermined level, (a) close the switch to supply induced power generated in the motor to the actuator, if a motor-side voltage of the switch is higher than an actuator-side voltage of the switch, and (b) open the switch, if the motor-side voltage of the switch is no higher than the actuator-side voltage of the switch.

According to this construction, the magnetic disk drive supplies the induced power to the actuator to retract the magnetic head, if the motor-side voltage is higher than the actuator-side voltage in the retraction period. If the motor-side voltage is no higher than the actuator-side voltage, the magnetic disk drive opens the switch, to prevent the actuator-side voltage from flowing toward the motor and interfering with the rotation of the motor.

Accordingly, even if the power supply voltage temporarily recovers due to chattering, the power supply voltage is kept from reaching the motor and thereby accelerating a halt of the rotation of the motor. Once chattering has subsided and the power supply voltage has returned to 0, the magnetic disk drive resumes supplying the induced power to the actuator to continue retracting the magnetic head.

Here, the power supply may be a direct-current power supply, wherein the motor is a three-phase alternating-current motor, a plurality of switches are each inserted in a connecting line, corresponding to a different phase, between the three-phase alternating-current motor and the actuator, and the switch control unit (a) closes, if a motor-side voltage is higher than an actuator-side voltage in any of the plurality of switches, the switch to rectify three-phase alternating-current induced power generated in the three-phase alternating-current motor and supply the rectified power to the actuator, and (b) opens, if a motor-side voltage is no higher than an actuator-side voltage in all of the plurality of switches, the plurality of switches.

According to this construction, the magnetic disk drive selectively closes the plurality of switches, to rectify the three-phase AC induced power and supply the rectified power to the actuator.

Here, the switch control unit may include: a specification circuit operable to detect a motor-side voltage and an actuator-side voltage for each of the plurality of switches, and specify a highest voltage out of voltages detected for the plurality of switches; and a control circuit operable to (a) close, if the highest voltage is a motor-side voltage of any of the plurality of switches, the switch, and (b) open, if the highest voltage is an actuator-side voltage of any of the plurality of switches, the plurality of switches.

The induced power of the motor is three-phase AC power, so that a highest-voltage phase differs periodically. According to the above construction, only a switch corresponding to a highest-voltage phase is closed. In this way, the magnetic disk drive rectifies the induced power efficiently. When the power supply voltage recovers temporarily due to chattering, the actuator-side voltage increases. Upon detecting this, the magnetic disk drive opens all of the switches.

Here, the switch control unit may include: a comparison circuit operable to compare a motor-side voltage and an actuator-side voltage for each of the plurality of switches; and a control circuit operable to close the switch if the comparison circuit judges that the motor-side voltage is higher than the actuator-side voltage, and open the switch if the comparison circuit judges that the motor-side voltage is no higher than the actuator-side voltage.

The induced power of the motor is three-phase AC power, so that a highest-voltage phase differs periodically. According to the above construction, only a switch with a motor-side voltage higher than an actuator-side voltage is closed. In this way, the magnetic disk drive rectifies the induced power efficiently. When the power supply voltage recovers temporarily due to chattering, the motor-side voltage becomes no higher than the actuator-side voltage in all of the switches. Accordingly, the magnetic disk drive opens all of the switches.

Here, the magnetic disk drive may further include: a step-up circuit operable to step-up a voltage of power supplied to the actuator, wherein the switch is a MOS transistor, with a source connected to the coil of the motor and a drain connected to the power terminal of the actuator, and the switch control unit (a) applies the stepped-up voltage to a gate of the MOS transistor to produce conduction between the source and the drain if the MOS transistor has a source voltage higher than a drain voltage, and (b) refrains from applying the stepped-up voltage to the gate of the MOS transistor to prevent conduction between the source and the drain if the MOS transistor has a source voltage no higher than a drain voltage.

According to this construction, the switch can be integrated in a semiconductor chip in a smaller size, and lower power consumption can be achieved.

Here, when the judgment circuit judges that the voltage of the power supply is equal to or above the predetermined level, the switch control unit may close the switch to supply power from the power supply to the motor to have the motor rotate the magnetic disk.

According to this construction, the magnetic disk drive supplies power from the power supply to the motor via the switch, if the power supply voltage is equal to or above the predetermined level. Which is to say, the switch has a function of supplying power from the power supply to the motor in the normal operation period and a function of supplying induced power from the motor to the actuator in the retraction period.

By using the switch in this way, the entire circuitry can be downsized.

Here, the power supply may be a direct-current power supply, wherein the motor is a three-phase alternating-current motor, a plurality of switches are each inserted in a connecting line, corresponding to a different phase, between the three-phase alternating-current motor and the actuator, and the switch control unit selectively closes the plurality of switches, to convert the power from the direct-current power supply to three-phase alternating-current power and supply the three-phase alternating-current power to the three-phase alternating-current motor.

According to this construction, the magnetic disk drive selectively closes the plurality of switches, to convert power from the DC power supply to three-phase AC power and supply the three-phase AC power to the motor.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENTS

First Embodiment (Overview)

In the first embodiment of the present invention, a step-up circuit in a maximum detection circuit operates from the normal operation period, to fully charge a capacitor beforehand. This being so, when power from a power supply stops, the step-up circuit immediately applies a stepped-up voltage to a switch in a rectification circuit. As a result, a magnetic head can be retracted immediately.

(Overall Construction of a Magnetic Disk Drive)

Figure 1:
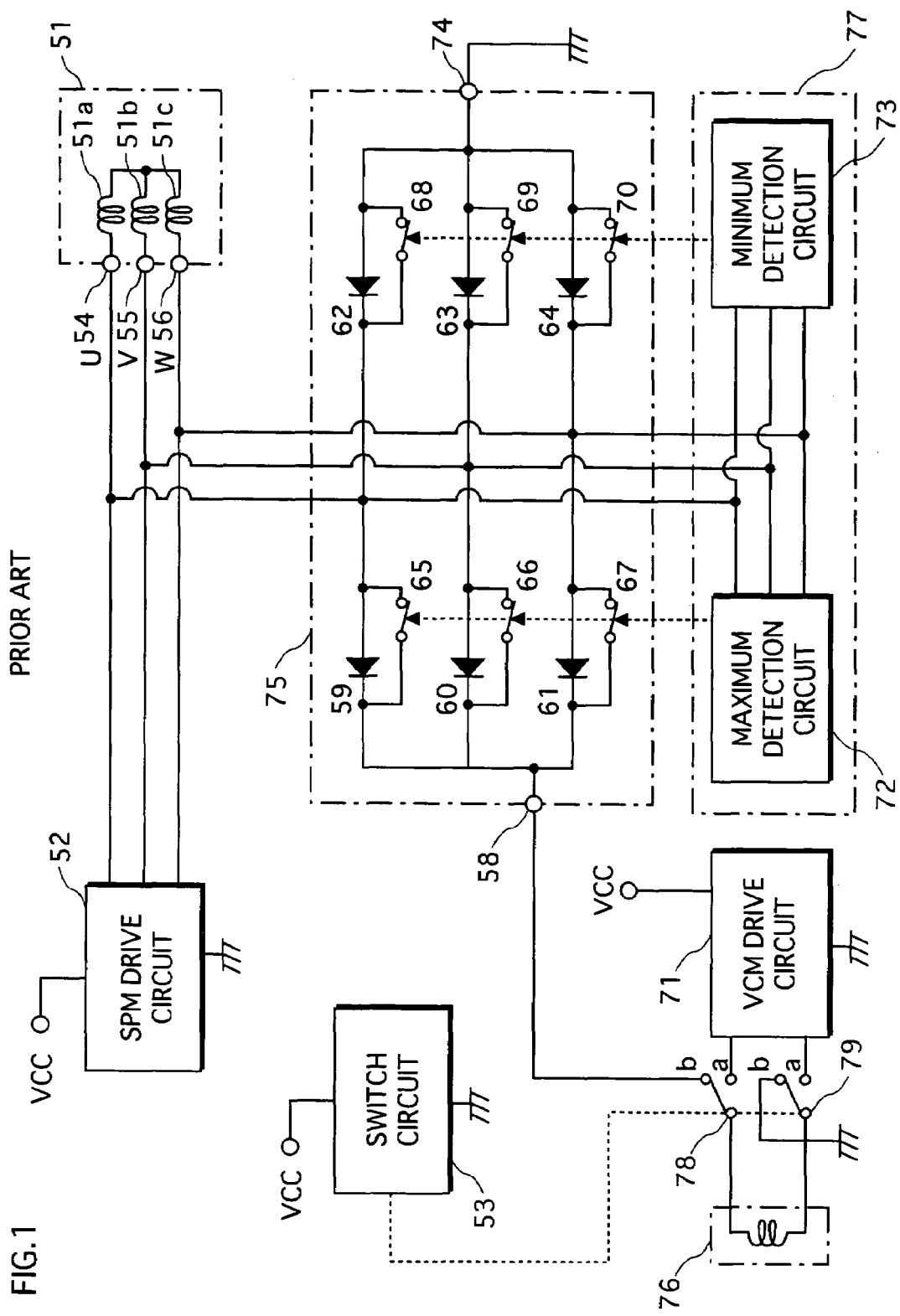
FIG. 1 shows a construction of a magnetic disk drive disclosed in Unexamined Japanese Patent Application Publication No. 2001-307408.
Figure 2:
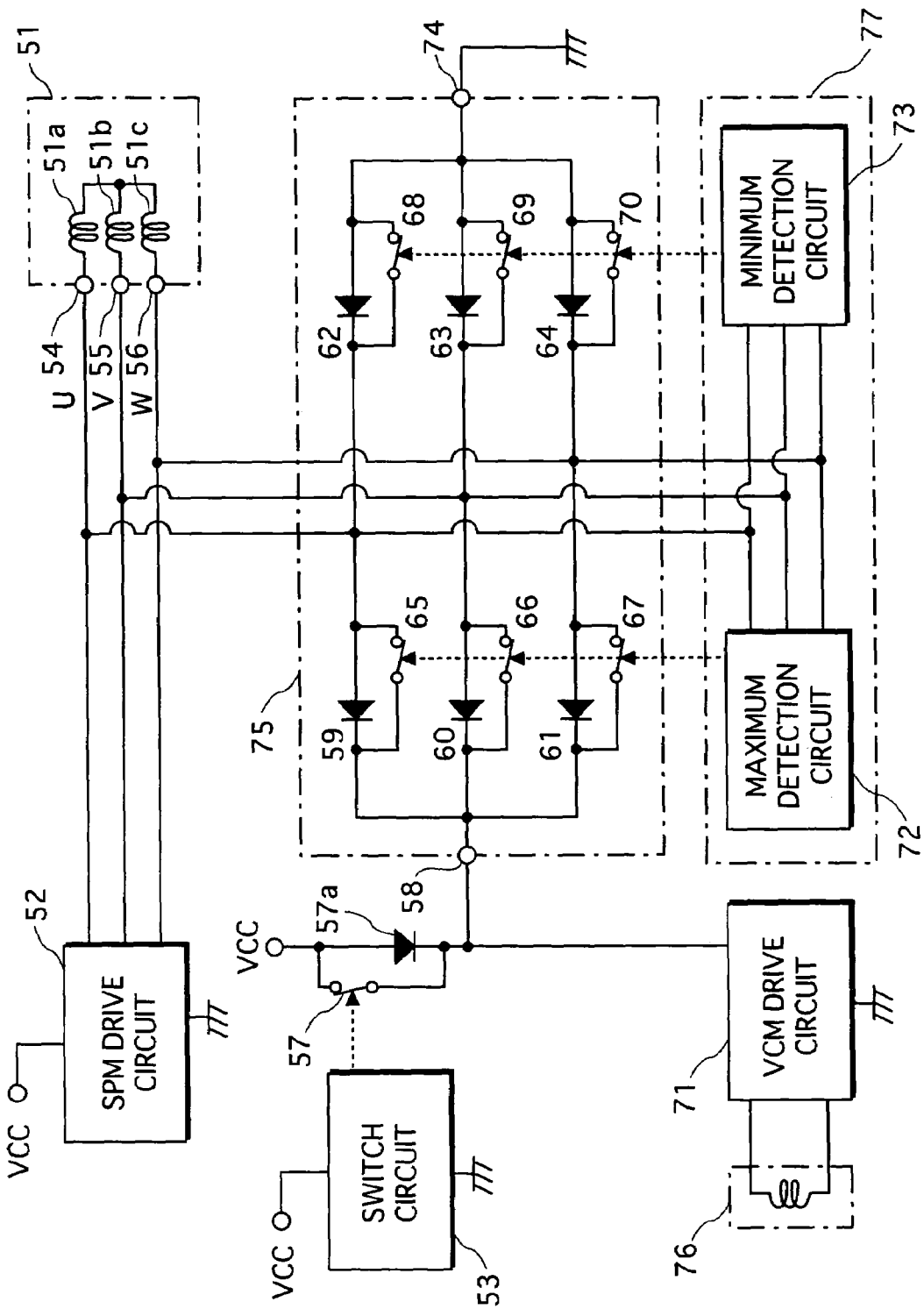
FIG. 2 shows a construction of a magnetic disk drive considered by the inventors of the present application.
Figure 3:
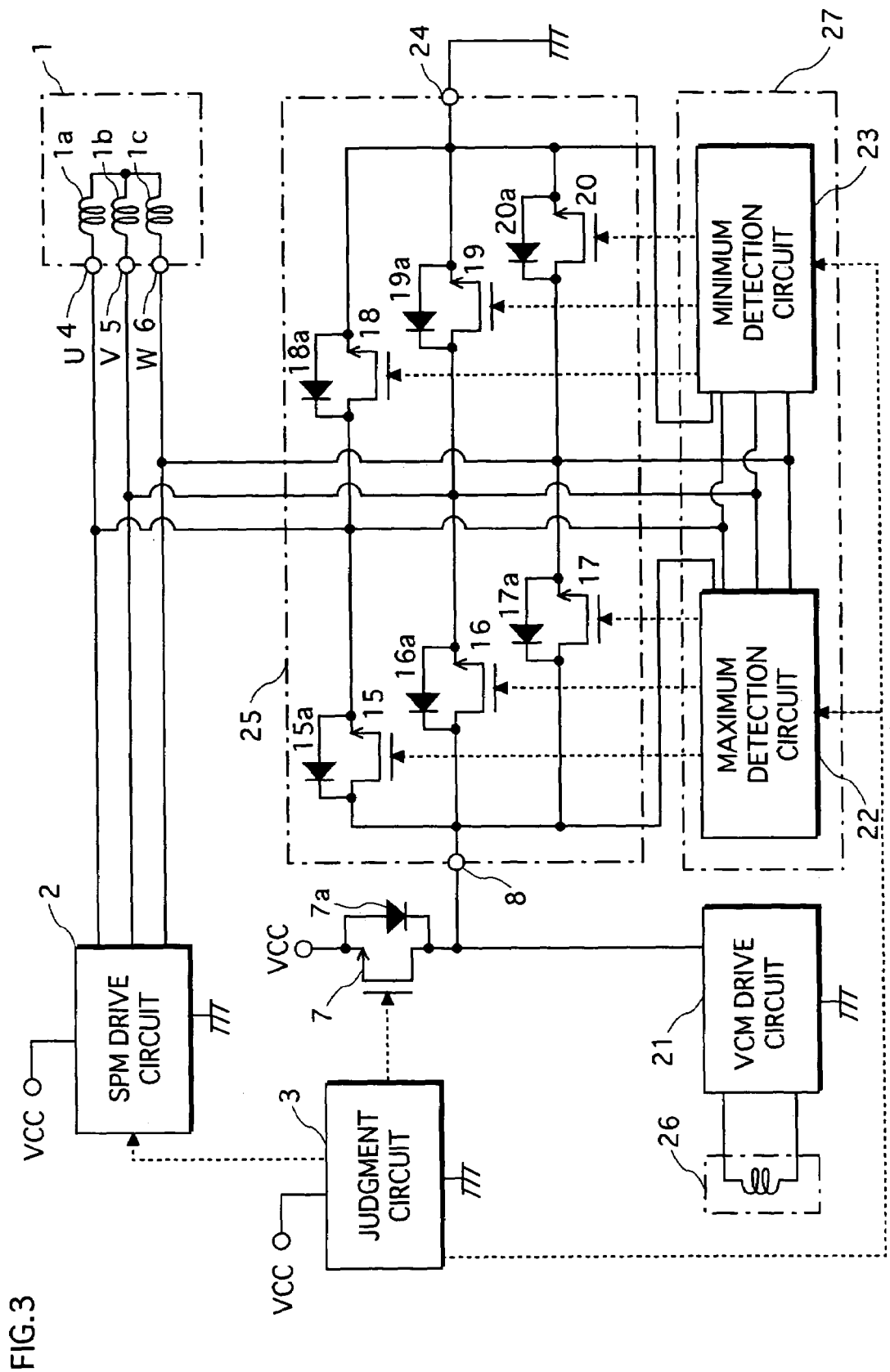
FIG. 3 shows a construction of a magnetic disk drive to which the first embodiment of the invention relates.

FIG. 3 shows a construction of a magnetic disk drive to which the first embodiment relates.

This magnetic disk drive includes a spindle motor 1, a SPM drive circuit 2, a voice coil motor 26, a VCM drive circuit 21, a judgment circuit 3, a switch 7, a rectification circuit 25, and a control circuit 27. The magnetic disk drive draws power from a DC (direct current) power supply during the normal operation period.

The spindle motor 1 is a three-phase AC motor for rotating a magnetic disk. The spindle motor 1 has three motor coils 1a, 1b, and 1c. Terminals 4, 5, and 6 of the spindle motor 1 are respectively U-phase, V-phase, and W-phase terminals.

The SPM drive circuit 2 drives the spindle motor 1. In the normal operation period, the SPM drive circuit 2 converts DC power of a DC power supply to three-phase AC power, and feeds the three-phase AC power to the spindle motor 1.

The voice coil motor 26 is an actuator for positioning a magnetic head. The voice coil motor 26 is driven by power supplied at a power terminal thereof.

The VCM drive circuit 21 drives the voice coil motor 26.

The judgment circuit 3 monitors power supply voltage VCC. If VCC is below a predetermined level, the judgment circuit 3 judges that the magnetic head should be retracted, and notifies this to the SPM drive circuit 2, the switch 7, and the control circuit 27. This notification is made using, for example, a signal voltage which is high in the normal operation period and low in the retraction period. The judgment circuit 3 includes a holding circuit. Once the signal voltage has become low, the holding circuit holds the signal voltage low even if the power supply voltage recovers, unless the magnetic head is completely retracted.

The switch 7 in closed if the signal voltage from the judgment circuit 3 is high, and opened if the signal voltage is low. The switch 7 is a double-diffused MOS transistor, and a diode 7a is a body diode equipped with the double-diffused MOS transistor.

The rectification circuit 25 rectifies three-phase AC induced power generated in the spindle motor 1 and feeds the rectified power to the VCM drive circuit 21, in the retraction period. The rectification circuit 25 contains switches 15 to 20. Each of the switches 15 to 20 is a double-diffused MOS transistor equipped with a body diode.

The switches 15 to 17 are connected to an output terminal 8 at one end, and to the respective terminals 4 to 6 at the other end. The switches 15 to 17 are controlled by a maximum detection circuit 22 in the control circuit 27.

The switches 18 to 20 are connected to a ground terminal 24 at one end, and to the respective terminals 4 to 6 at the other end. The switches 18 to 20 are controlled by a minimum detection circuit 23 in the control circuit 27.

The control circuit 27 controls the switches 15 to 20 in the rectification circuit 25. In the normal operation period, the control circuit 27 opens all of the switches 15 to 20. In the retraction period, the control circuit 27 selectively closes the switches 15 to 20, to rectify the induced power of the spindle motor 1. Here, the control circuit 27 references the signal voltage from the judgment circuit 3, to determine whether the normal operation period or the retraction period. The control circuit 27 includes the maximum detection circuit 22 and the minimum detection circuit 23, to control the rectification circuit 25 to efficiently rectify the induced power in the retraction period.

The maximum detection circuit 22 monitors U-phase, V-phase, and W-phase voltages, and closes one of the switches 15 to 17 corresponding to a highest-voltage phase. The minimum detection circuit 23 monitors U-phase, V-phase, and W-phase voltages, and closes one of the switches 18 to 20 corresponding to a lowest-voltage phase.

As a result, the VCM drive circuit 21 receives power from the power supply during the normal operation period, and induced power from the spindle motor 1 during the retraction period.

The following describes the maximum detection circuit 22 that is a main feature of the present invention, in more detail.

(Maximum Detection Circuit 22)

Figure 4:
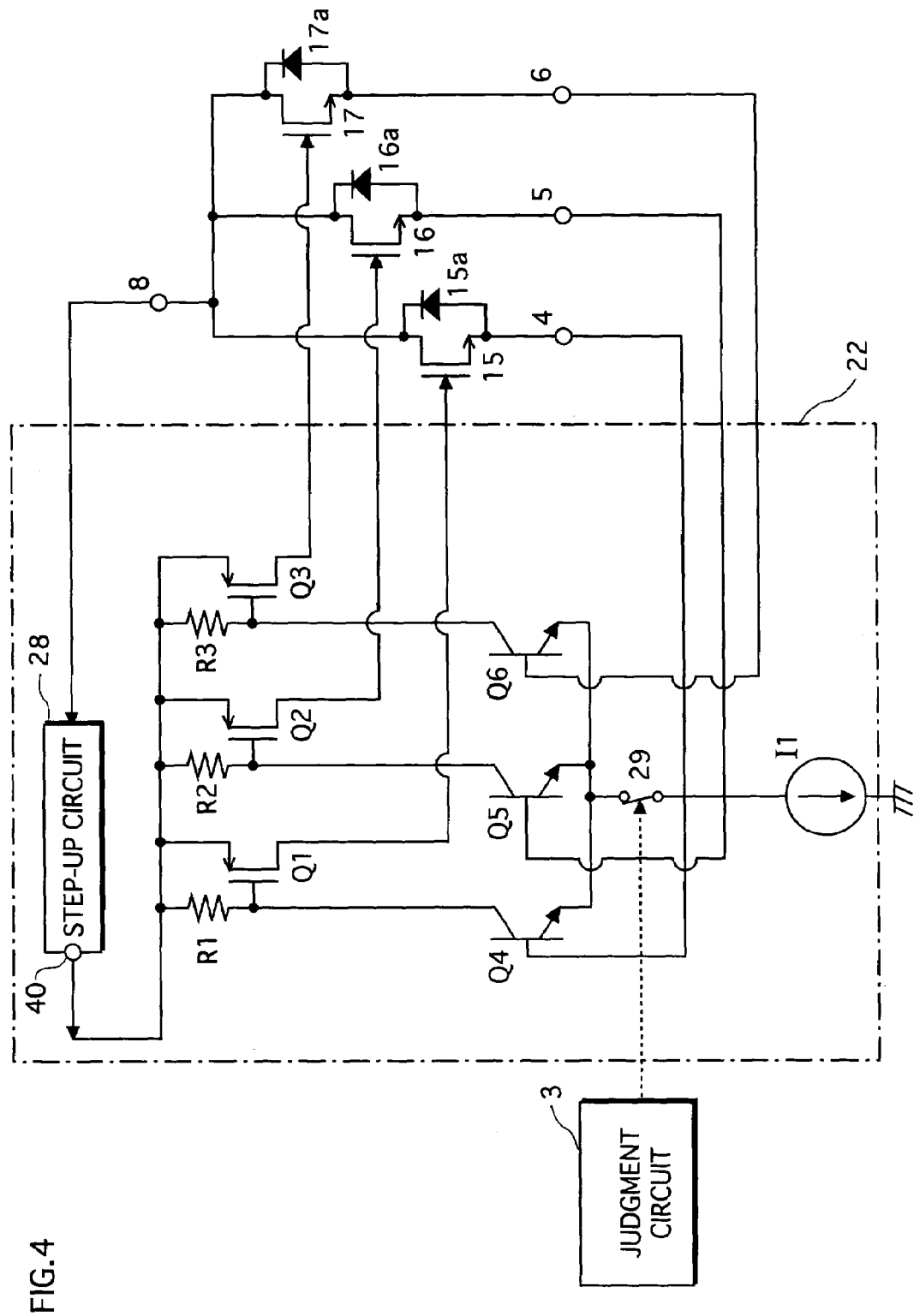
FIG. 4 shows a construction of a maximum detection circuit shown in FIG. 3.

FIG. 4 shows a construction of the maximum detection circuit 22.

The maximum detection circuit 22 includes a step-up circuit 28, a switch 29, a constant-current generator I1, resistors R1 to R3, and transistors Q1 to Q6.

The step-up circuit 28 steps-up voltage V8 of the terminal 8. Voltage V8 is equal to a voltage supplied to the VCM drive circuit 21. Which is to say, voltage V8 is approximately equal to power supply voltage VCC in the normal operation period, and equal to a voltage generated by rectifying the induced power of the spindle motor 1 in the retraction period.

To efficiently use the induced power in the retraction period, it is important to bring one of the switches 15 to 17 into full conduction. To do so, a voltage of about 5V need be applied to a gate of that switch. The voltage of the induced power is, at most, only about 2V to 3V. Therefore, the maximum detection circuit 22 steps-up the voltage of the induced power by means of the step-up circuit 28 and applies the stepped-up voltage to the switch, to bring the switch into full conduction.

The constant-current generator I1 generates a constant current.

The switch 29 is opened in the normal operation period and closed in the retraction period, in accordance with the signal voltage from the judgment circuit 3. When the switch 29 is closed, the constant current flows through the transistors Q4 to Q6, as a result of which the maximum detection circuit 22 begins to operate. Here, if the constant-current generator I1 has a switch function, the operation of the maximum detection circuit 22 may be started using the switch function of the constant-current generator I1 instead of the switch 29. In such a case, the switch 29 can be omitted.

The resistors R1 to R3 have approximately equal resistances.

The transistors Q1 to Q3 are MOS transistors having approximately equal electrical properties. The transistors Q1 to Q3 have sources connected to the step-up circuit 28, and drains connected respectively to gates of the switches 15 to 17. The resistors R1 to R3 are situated between gates and sources of the transistors Q1 to Q3, respectively.

The transistors Q4 to Q6 are bipolar transistors having approximately equal electrical properties.

The transistors Q4 to Q6 have collectors connected respectively to the gates of the transistors Q1 to Q3, emitters connected to the switch 29, and bases connected respectively to the terminals 4 to 6.

Operations of the maximum detection circuit 22 in the normal operation period and in the retraction period are explained below.

In the normal operation period, voltage V8 of the terminal 8 is approximately equal to power supply voltage VCC. The step-up circuit 28 steps-up voltage V8, and applies the stepped-up voltage to the sources of the transistors Q1 to Q3.

In the normal operation period, the signal voltage from the judgment circuit 3 is high, so that the switch 29 is opened. Therefore, collector currents of the transistors Q4 to Q6 are all 0.

Since the collector currents of the transistors Q4 to Q6 are all 0, gate voltages of the transistors Q1 to Q3 are equal respectively to source voltages of the transistors Q1 to Q3. Hence the transistors Q1 to Q3 are all opened.

As a result, the gates of the switches 15 to 17 are all low, and the switches 15 to 17 are all opened.

In the retraction period, on the other hand, voltage V8 is equal to a voltage obtained by rectifying the induced power of the spindle motor 1 using the switches 15 to 17. The step-up circuit 28 steps-up voltage V8, and applies the stepped-up voltage to the sources of the transistors Q1 to Q3.

In the retraction period, the signal voltage from the judgment circuit 3 is low. Accordingly, the switch 29 is closed. This drives the transistors Q4 to Q6. Of the transistors Q4 to Q6, only a transistor having a highest base voltage is closed.

The induced power of the spindle motor 1 is three-phase AC power. Accordingly, voltage waveforms of the three phases differ by an electrical angle of 120°. In other words, a highest-voltage phase differs periodically. For instance, voltage V4 of the terminal 4 is highest in one time period, but voltage V5 of the terminal 5 is highest in the next time period. In accordance with this, the transistors Q4 to Q6 are closed in turn.

As one example, when voltage V4 is highest of voltages V4 to V6, the transistor Q4 is closed whereas the transistors Q5 and Q6 are opened. In this case, the collector current of the transistor Q4 flows through the resistor R1, as a result of which a potential difference occurs between both ends of the resistor R1. This closes the transistor Q1. As a result, output voltage V40 of the step-up circuit 28 is applied to the gate of the switch 15, so that the switch 15 is closed. Meanwhile, the switches 16 and 17 are opened, since the transistors Q5 and Q6 are opened.

Likewise, when voltage V5 is highest of voltages V4 to V6, the switch 16 is closed whereas the switches 15 and 17 are opened. When voltage V6 is highest of voltages V4 to V6, the switch 17 is closed whereas the switches 15 and 16 are opened.

In this way, the maximum detection circuit 22 closes one of the switches 15 to 17 corresponding to a highest-voltage phase.

A detailed construction of the step-up circuit 28 is explained below.

Figure 5:
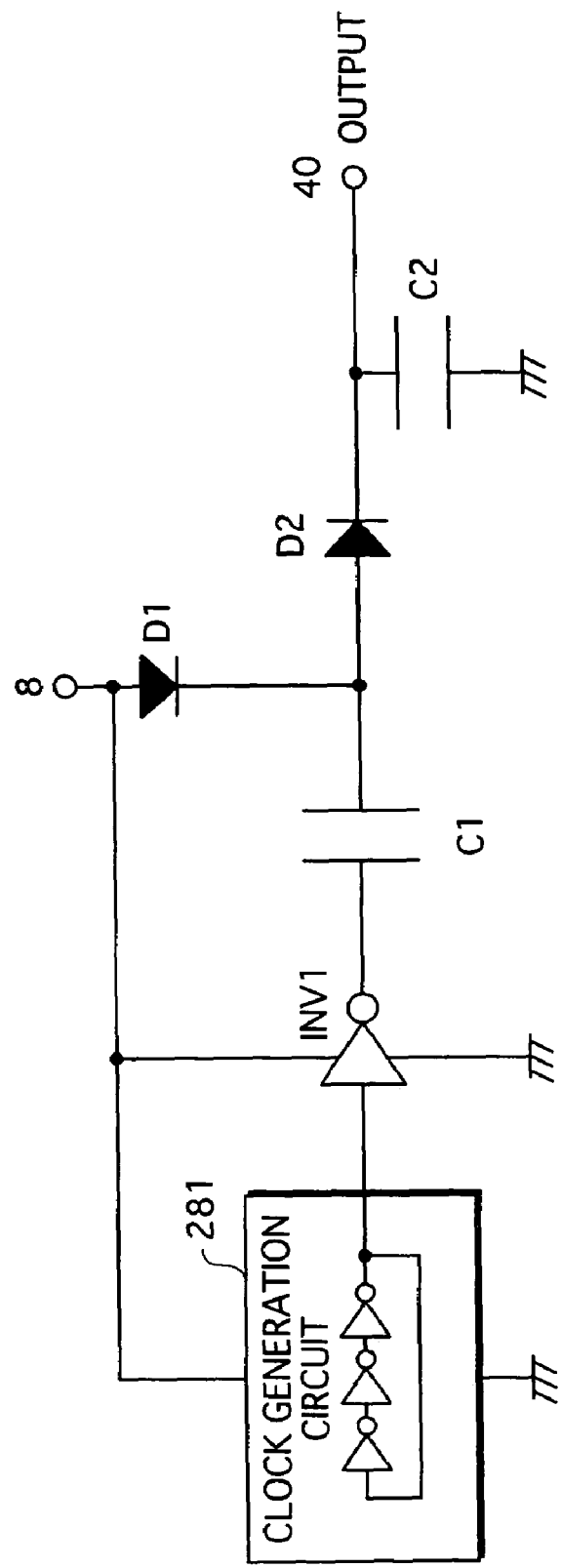
FIG. 5 shows a construction of a step-up circuit shown in FIG. 4.

FIG. 5 shows a construction of the step-up circuit 28.

In the drawing, a clock generation circuit 281 generates and outputs a clock signal which periodically alternates between high (V8) and low (ground voltage). As one example, a ring oscillator is used as the clock generation circuit 281.

The ring oscillator has an odd number of (three or more) cascaded inverters. An output voltage of the last inverter is output as the clock signal, and also input to the first inverter as an input voltage.

An inverter INV1 inverts the clock signal in phase.

A capacitor C1 is charged by power from the terminal 8 through a diode D1, when the output of the inverter INV1 is low. Here, the charging voltage of the capacitor C1 is affected by a forward voltage of the diode D1. When the forward voltage of the diode D1 is VD1 (about 0.7V), the charging voltage of the capacitor C1 is V8–VD1.

When the output of the inverter INV1 is high, on the other hand, the capacitor C1 discharges to a capacitor C2 through a diode D2. As a result, a sum of voltage V8 and the charging voltage of the capacitor C1 is given to the capacitor C2. Here, the charging voltage of the capacitor C2 decreases by the forward voltage of the diode D2.

In this way, the step-up circuit 28 outputs a doubling of voltage V8, so long as voltage V8 is high enough to ignore the forward voltages of the diodes D1 and D2 and the capacitances of the capacitors C1 and C2 are appropriately set according to power consumption of the load (i.e. each component in the maximum detection circuit 22).

(Overall Operation of the Magnetic Disk Drive)

The following explains an overall operation of the magnetic disk drive having the above construction.

Figure 6:
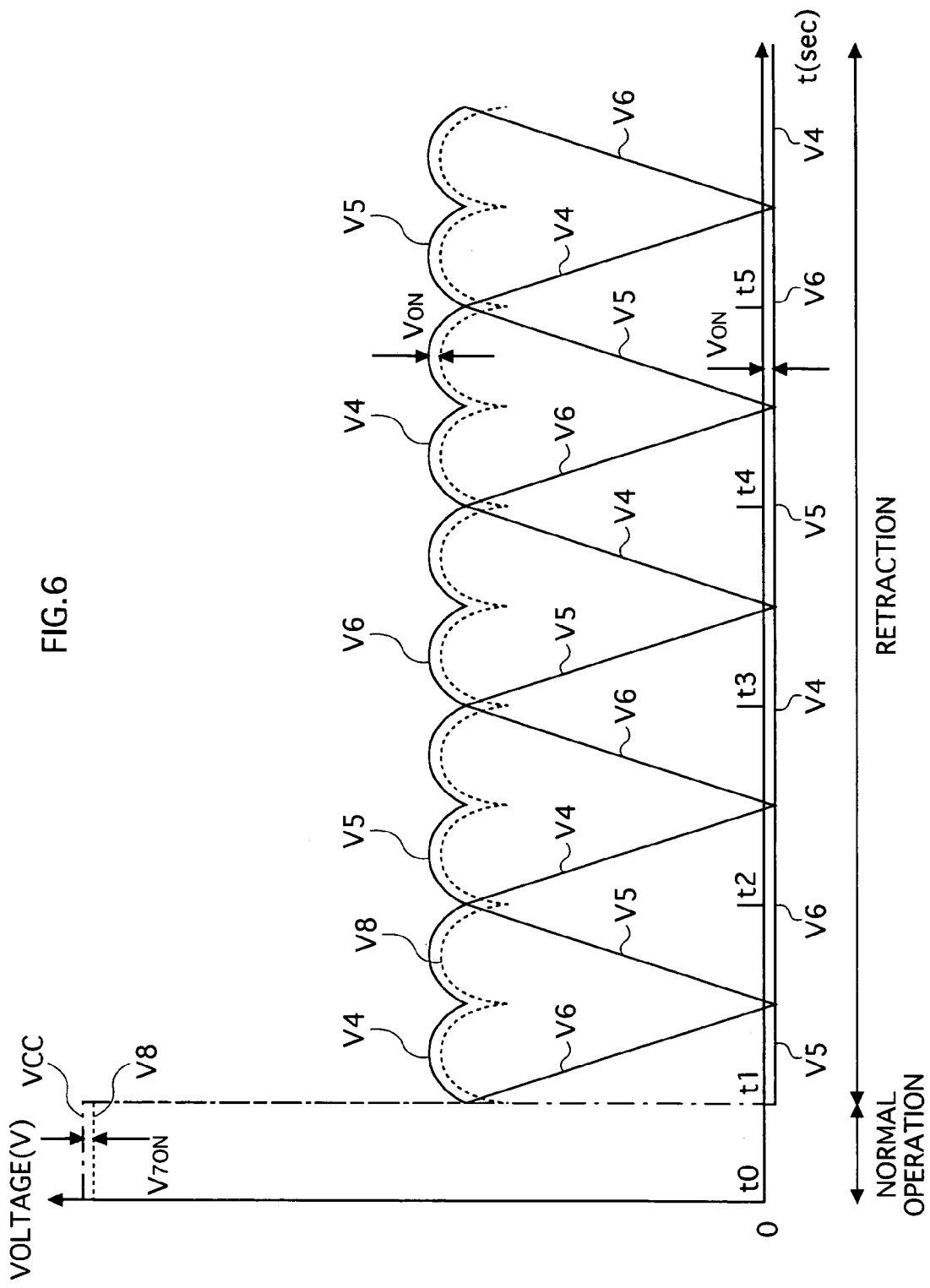
FIG. 6 shows voltages of terminals in the magnetic disk drive shown in FIG. 3.

FIG. 6 shows voltages of the terminals in the magnetic disk drive.

In the drawing, the vertical axis represents voltage, and the horizontal axis represents time. VCC denotes the power supply voltage, V4 to V6 denote the voltages of the respective terminals 4 to 6, and V8 denotes the voltage of the terminal 8. V7on denotes a voltage drop (about 0.3V) caused by an ON resistance of the switch 7. Von denotes a voltage drop (about 0.3V) caused by an ON resistance of each of the switches 15 to 20.

FIG. 6 illustrates an example where the magnetic disk drive suddenly becomes unable to receive power from the power supply at t1. That is, power supply voltage VCC is at a normal level at t0, but drops to 0 at t1.

This being the case, the magnetic disk drive operates in the following manner.

The switch 7 is closed during the normal operation period of t0 to t1. This being so, power from the power supply is supplied to the VCM drive circuit 21 via the switch 7. During this time, voltage V8 is VCC–V7on. Voltage V8 is equal to a voltage supplied to the VCM drive circuit 21.

At t1, power supply voltage VCC drops to 0. The judgment circuit 3 judges that the magnetic head need be retracted, and notifies this to the SPM drive circuit 2, the switch 7, and the control circuit 27. In response, the switch 7 is opened. Also, the SPM drive circuit 2 disconnects the spindle motor 1 and the power supply. By doing so, the induced power of the spindle motor 1 is kept from reaching the power supply via the switch 7 or the SPM drive circuit 2.

Upon receiving the notification from the judgment circuit 3, the maximum detection circuit 22 and the minimum detection circuit 23 in the control circuit 27 start controlling the switches 15 to 20 to rectify the induced power of the spindle motor 1. Here, the step-up circuit 28 in the maximum detection circuit 22 operates from before t1, so that the maximum detection circuit 22 can start controlling the switches 15 to 17 immediately.

Since the induced power of the spindle motor 1 is three-phase AC power, a highest-voltage phase differs periodically. In FIG. 6, voltage V4 is highest from t1 to t2, voltage V5 is highest from t2 to t3, and voltage V6 is highest from t3 to t4.

The maximum detection circuit 22 detects U-phase, V-phase, and W-phase voltages V4 to V6, and closes one of the switches 15 to 17 corresponding to a highest-voltage phase. As a result, the switches 15 to 17 are closed in the following order.

t1 to t2: switch 15
t2 to t3: switch 16
t3 to t4: switch 17

The induced power is supplied to the VCM drive circuit 21 through the switch that is closed. As a result, voltage V8 changes as follows.

t1 to t2: V4–Von
t2 to t3: V5–Von
t3 to t4: V6–Von

Thus, the magnetic disk drive efficiently rectifies the induced power, by closing only a switch corresponding to a highest-voltage phase.

As described above, the step-up circuit 28 steps-up voltage V8 in both the normal operation period and the retraction period. This enables the step-up circuit 28 to apply stepped-up voltage V40 to one of the switches 15 to 17 as soon as the retraction period begins. Hence the magnetic disk drive can start retracting the magnetic head immediately in the retraction period.

The maximum detection circuit 22 opens all of the switches 15 to 17 in the normal operation period, and selectively closes the switches 15 to 17 in the retraction period. In so doing, the maximum detection circuit 22 prevents a DC power supply voltage from reaching the spindle motor 1 in the normal operation period, and rectifies the induced power in the retraction period.

Also, the use of a ring oscillator as the clock generation circuit 281 in the step-up circuit 28 has the following advantage.

In the retraction period, the sole available power is the induced power of the spindle motor 1. In other words, the step-up circuit 28 is supplied with only a low voltage. This means the clock generation circuit 281 should be able to generate a clock signal stably with a low voltage. A ring oscillator has a very simple circuit construction and does not need a bias circuit, and so is capable of generating a clock signal stably with an extremely low voltage (e.g. below 1V). For this reason, it is desirable to use a ring oscillator as the clock generation circuit 281.

Second Embodiment (Overview)

The magnetic disk drive of the first embodiment is designed on the assumption that power supply voltage VCC is constantly 0 in the retraction period. However, there are instances where power supply voltage VCC is not constantly 0 in there traction period. For example, when a mechanical switch is included in the magnetic disk drive or a power supply system for supplying power to the magnetic disk drive, chattering may occur. Chattering refers to a phenomenon where a switch repeatedly changes its state in a short time period immediately after the switch is opened or closed. If chattering occurs, power supply voltage VCC recovers intermittently in the retraction period. This causes power from the power supply to reach the terminal 8 via the body diode 7a of the switch 7.

Meanwhile, once the retraction period has begun, the maximum detection circuit 22 starts its operation. Accordingly, one of the switches 15 to 17 is closed. This being the case, if power supply voltage VCC recovers temporarily, the switch that is closed remains closed, because power supply voltage VCC is higher than the voltage of the induced power. This phenomenon is called latch-up. For example, if the switch 15 is closed, voltage V4 is raised to voltage V8 and so becomes constantly highest of voltages V4 to V6. As a result, the switch 15 remains closed.

If latch-up occurs, the DC power reaches the spindle motor 1 through the switch that remains closed. This interferes with the rotation of the spindle motor 1 and accelerates a halt of the rotation. As a result, the magnetic disk drive becomes unable to use the induced power efficiently, which is likely to cause a lack of power supplied to the VCM drive circuit 21 and a failure to complete the retraction of the magnetic head.

In view of this, a magnetic disk drive of the second embodiment is designed to open all of the switches 15 to 17 if chattering occurs during the retraction period. In this way, the DC power is kept from reaching the spindle motor 1, with it being possible to complete the retraction of the magnetic head.

(Overall Construction of the Magnetic Disk Drive)

The magnetic disk drive of the second embodiment differs from that of the first embodiment only in the maximum detection circuit. Accordingly, the following explanation focuses on the maximum detection circuit while omitting the other components.

(Maximum Detection Circuit)

Figure 7:
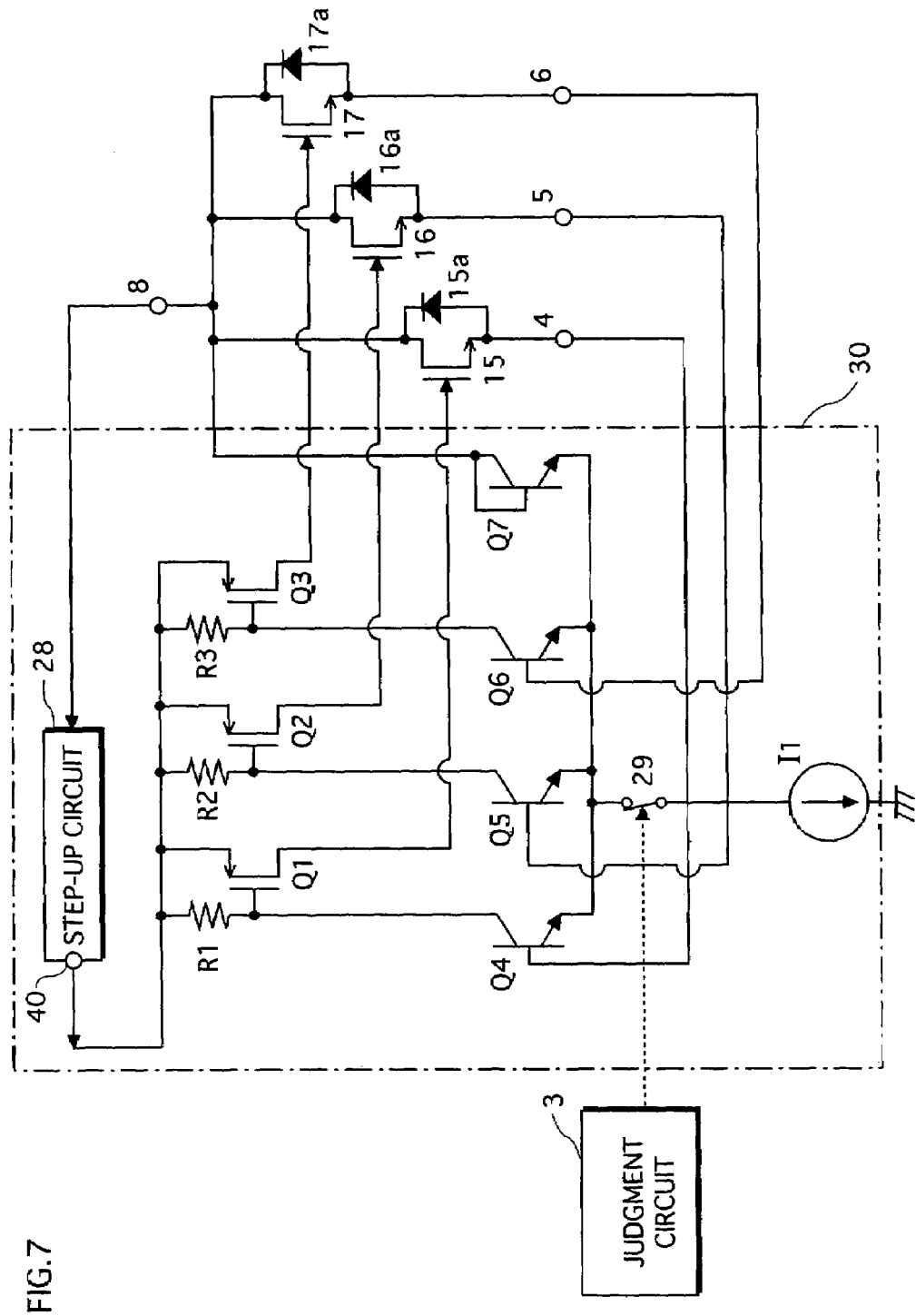
FIG. 7 shows a construction of a maximum detection circuit to which the second embodiment of the invention relates.

FIG. 7 shows a construction of a maximum detection circuit 30.

The maximum detection circuit 30 differs from the maximum detection circuit 22 of the first embodiment in that a transistor Q7 is newly included.

The transistor Q7 is a bipolar transistor having approximately equal electrical properties to the transistors Q4 to Q6. The transistor Q7 has a collector connected to the terminal 8, and an emitter connected to the switch 29.

Operations of this maximum detection circuit 30 in the normal operation period and in the retraction period are explained below.

In the normal operation period, the switch 29 is opened. Accordingly, the switches 15 to 17 are all opened, as in the first embodiment.

In the retraction period, the switch 29 is closed, which drives the transistors Q4 to Q7. Of the transistors Q4 to Q7, only a transistor having a highest base voltage is closed.

Voltage V8 is initially 0 in the retraction period. This being so, the transistors Q4 to Q6 are closed in turn periodically, to rectify the induced power of the spindle motor 1. During this time, voltage V8 is equal to the rectified voltage. For example, when the switch 15 is closed, V8=V4−Von. When the switch 16 is closed, V8=V5−Von. When the switch 17 is closed, V8=V6−Von. Thus, whichever switch is closed, voltage V8 never exceeds all of voltages V4 to V6, and so the transistor Q7 remains opened.

If chattering occurs, however, power supply voltage VCC recovers temporarily, which causes a rise in voltage V8. If voltage V8 exceeds voltages V4 to V6, the transistor Q7 is closed, whilst the transistors Q4 to Q6 are opened. As a result, the switches 15 to 17 are all opened. Thus, the magnetic disk drive opens all of the switches 15 to 17 if power supply voltage VCC recovers, to prevent the DC power from reaching the spindle motor 1.

Once chattering has subsided and voltage V8 has fallen below any of voltages V4 to V6, the magnetic disk drive resumes rectifying the induced power of the spindle motor 1 and supplying the rectified power to the VCM drive circuit 21.

(Overall Operation of the Magnetic Disk Drive)

An overall operation of the magnetic disk drive having the above construction is explained below.

Figure 8:
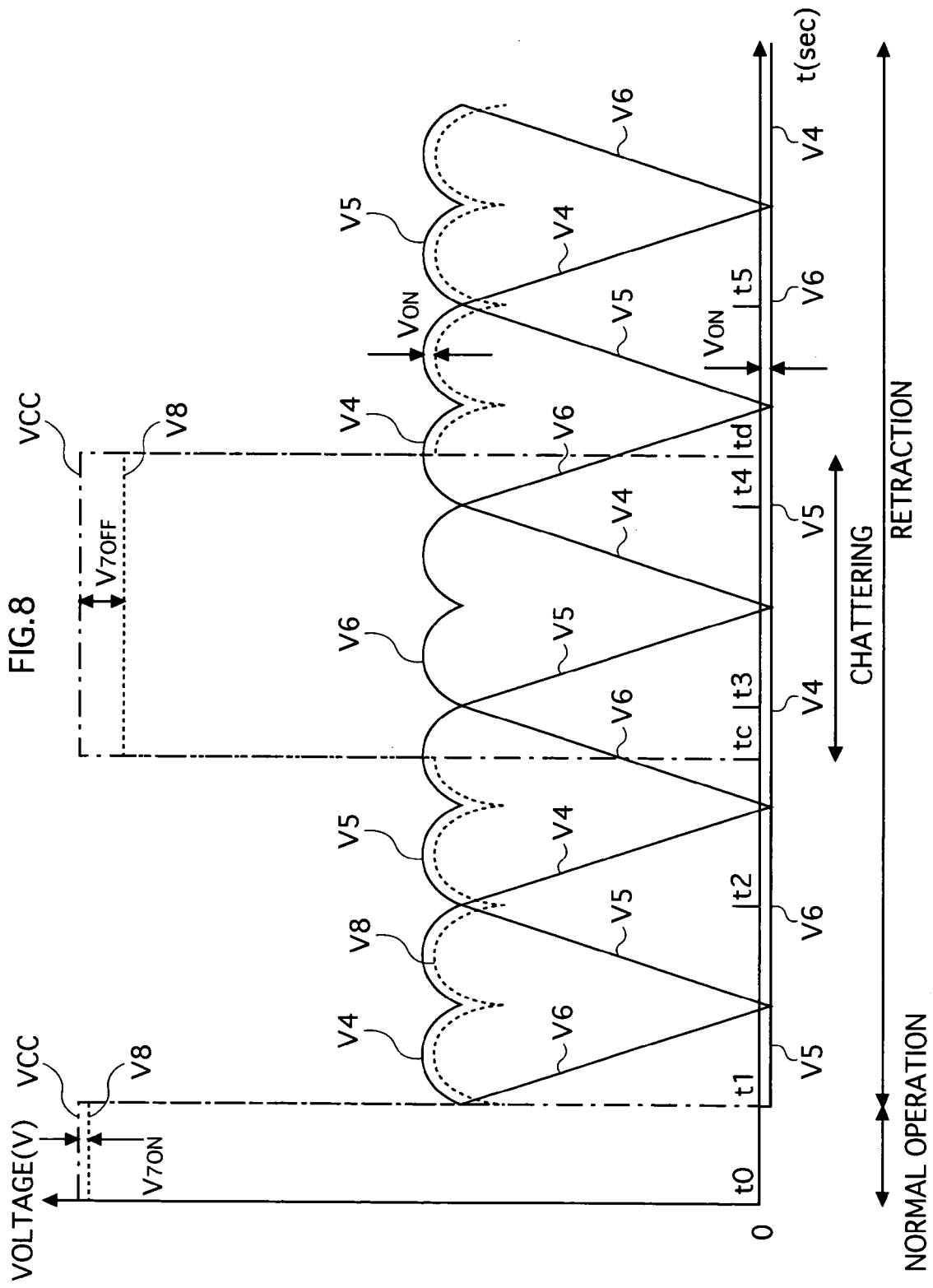
FIG. 8 shows voltages of terminals in the magnetic disk drive in the second embodiment.

FIG. 8 shows voltages of the terminals in the magnetic disk drive.

In the drawing, V7 off denotes a voltage drop (about 0.7V) caused by the body diode 7a.

FIG. 8 uses an example where power supply voltage VCC recovers due to chattering from tc to td in the retraction period. Therefore, power supply voltage VCC is at a normal level during the chattering period of tc to td.

This being so, the magnetic disk drive operates in the following manner.

Up to tc, the magnetic disk drive operates in the same way as in the first embodiment. During this time, voltage V8 never exceeds all of voltages V4 to V6, and accordingly the transistor Q7 is opened.

From tc to td, power supply voltage VCC returns to the normal level. Since the switch 7 is opened, power from the power supply reaches the terminal 8 through the body diode 7a of the switch 7. Accordingly, V8=VCC−V7 off. If voltage V8 exceeds voltages V4 to V6, the transistor Q7 is closed while the transistors Q4 to Q6 are opened. Hence the switch 15 to 17 are all opened. This prevents the DC power from reaching the spindle motor 1, with it being possible to minimize a drop in rotational speed of the spindle motor 1 in the chattering period.

After td, power supply voltage VCC drops to 0 once again. Hence the magnetic disk drive resumes rectifying the induced power of the spindle motor 1 and supplying the rectified power to the VCM drive circuit 21.

As described above, the maximum detection circuit 30 opens all of the switches 15 to 17 if chattering occurs during the retraction period. This makes it possible to prevent the DC power from reaching the spindle motor 1 and decreasing the rotational speed of the spindle motor 1.

Third Embodiment (Overview)

A magnetic disk drive of the third embodiment uses comparators in the maximum detection circuit.

(Overall Construction of the Magnetic Disk Drive)

The magnetic disk drive of the third embodiment differs from that of the second embodiment only in the maximum detection circuit. Accordingly, the following explanation focuses on the maximum detection circuit while omitting the other components.

(Maximum Detection Circuit)

Figure 9:
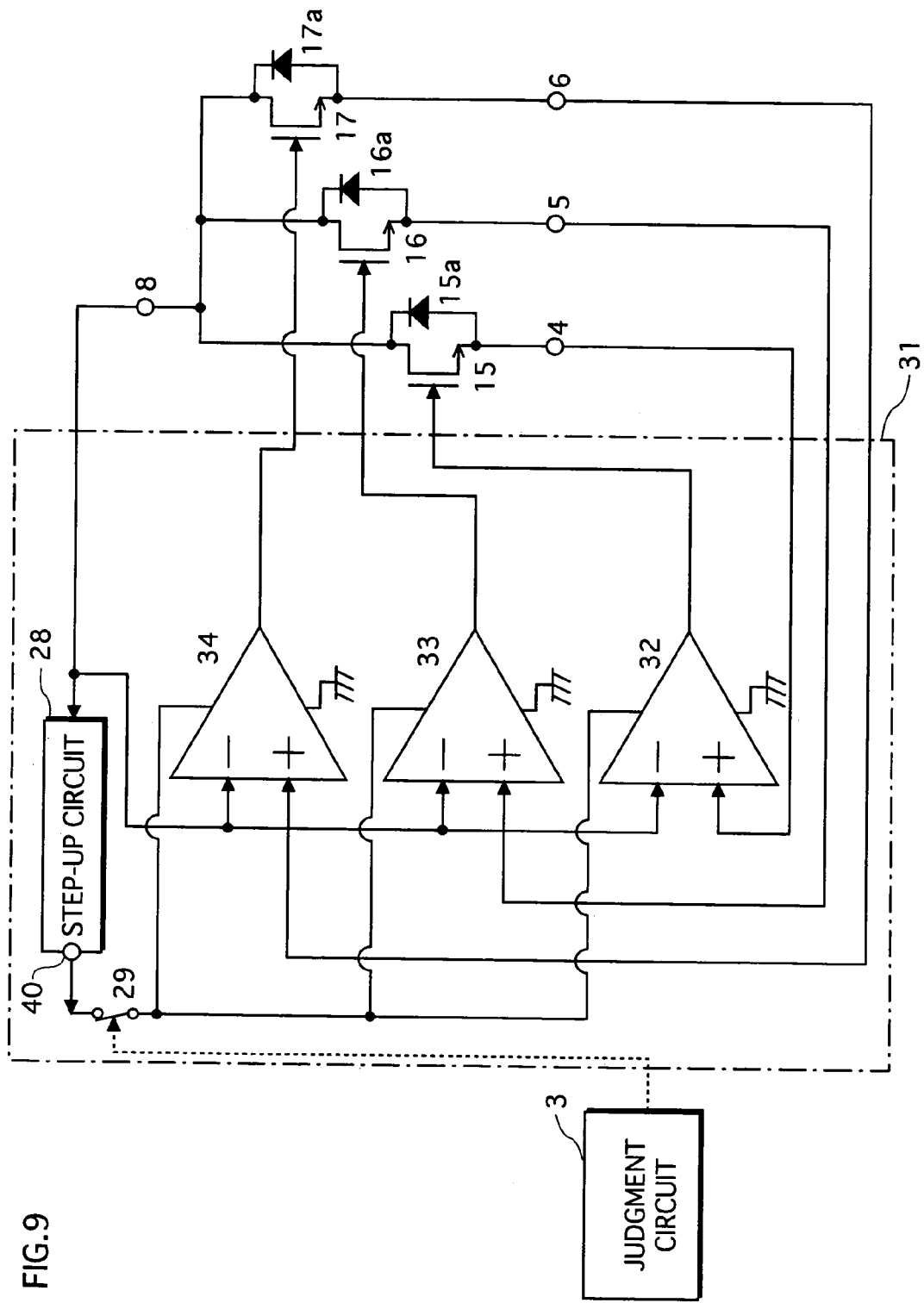
FIG. 9 shows a construction of a maximum detection circuit to which the third embodiment of the invention relates.

FIG. 9 shows a construction of a maximum detection circuit 31.

The maximum detection circuit 31 includes the step-up circuit 28, the switch 29, and comparators 32, 33, and 34.

The step-up circuit 28 steps-up voltage V8 and outputs the result, both in the normal operation period and in the retraction period.

The switch 29 is opened in the normal operation period and closed in the retraction period, according to the signal voltage from the judgment circuit 3.

The comparators 32 to 34 each compare voltages of plus and minus terminals. If the voltage of the plus terminal is higher than the voltage of the minus terminal, a voltage of a power terminal is output. If the voltage of the plus terminal is no higher than the voltage of the minus terminal, on the other hand, a voltage of a ground terminal is output. The power terminal of each of the comparators 32 to 34 is connected to the switch 29, whilst the ground terminal of each of the comparators 32 to 34 is connected to a ground. When the switch 29 is closed, the voltage of the power terminal is voltage V40 (high) obtained by stepping-up voltage V8 by the step-up circuit 28. The voltage of the ground terminal is a ground voltage (low).

Operations of this maximum detection circuit 31 in the normal operation period and in the retraction period are explained below.

In the normal operation period, voltage V8 is approximately equal to power supply voltage VCC. The step-up circuit 28 steps-up voltage V8 and supplies the stepped-up voltage to the switch 29.

In the normal operation period, the signal voltage from the judgment circuit 3 is high, and so the switch 29 is opened. Accordingly, the comparators 32 to 34 are not driven.

As a result, the gates of the switches 15 to 17 are all low, so that the switches 15 to 17 are all opened.

In the retraction period, the switch 29 is closed, thereby driving the comparators 32 to 34.

The comparator 32 compares voltages V4 and V8. If voltage V4 is higher than voltage V8, the comparator 32 outputs a high. If voltage V4 is no higher than voltage V8, the comparator 32 outputs a low. Which is to say, the switch 15 is closed if voltage V4 is higher than voltage V8, and opened if voltage V4 is no higher than voltage V8.

The comparator 33 compares voltages V5 and V8. If voltage V5 is higher than voltage V8, the comparator 33 outputs a high. If voltage V5 is no higher than voltage V8, the comparator 33 outputs a low. Which is to say, the switch 16 is closed if voltage V5 is higher than voltage V8, and opened if voltage V5 is no higher than voltage V8.

The comparator 34 compares voltages V6 and V8. If voltage V6 is higher than voltage V8, the comparator 34 outputs a high. If voltage V6 is no higher than voltage V8, the comparator 34 outputs a low. Which is to say, the switch 17 is closed if voltage V6 is higher than voltage V8, and opened if voltage V6 is no higher than voltage V8.

Since the induced power is three-phase AC power, voltage waveforms of the three phases differ by an electrical angle of 120°. Accordingly, a highest-voltage phase differs periodically. For instance, voltage V4 is highest in one time period, but voltage V5 is highest in the next time period. In accordance with this, the comparators 32 to 34 output a high in turn periodically.

As one example, if voltage V4 is highest of voltages V4 to V6, the comparator 32 outputs a high, so that the switch 15 is closed. During this time, voltage V4 and voltage V8 (=V4−Von) are input respectively in the plus and minus terminals of the comparator 32.

Voltage V4 gradually decreases with time in a sinusoidal waveform. In the meantime, voltage V5 gradually increases. When voltage V5 exceeds voltage V8 (=V4−Von), the comparator 33 outputs a high, so that the switch 16 is closed. At this point, the output of the comparator 32 is still a high, and so the switch 15 is still closed.

Immediately after this, voltage V4 further decreases and voltage V5 further increases, as a result of which voltage V4 falls below voltage V8 (=V5−Von). Accordingly, the comparator 32 outputs a low, so that the switch 15 is opened. At this point, voltage V5 is higher than voltage V8. Therefore, the comparator 33 outputs a high, and the switch 16 is closed.

Thus, the comparator 32 to 34 output a high in turn periodically, to close the switches 15 to 17 in turn. In doing so, the induced power is rectified efficiently.

If chattering occurs, power supply voltage VCC recovers temporarily and voltage V8 increases. When voltage V8 exceeds voltages V4 to V6, the comparators 32 to 34 all output a low, as a result of which the switches 15 to 17 are all opened. By such opening all of the switches 15 to 17, the magnetic disk drive keeps the DC power from reaching the spindle motor 1.

Once chattering has subsided and voltage V8 has fallen below any of voltages V4 to V6, the magnetic disk drive resumes rectifying the induced power of the spindle motor 1 and supplying the rectified power to the VCM drive circuit 21.

Fourth Embodiment (Overview)

In the second embodiment, the SPM drive circuit 2 includes a DC/AC converter, and converts the DC power from the power supply to three-phase AC power and supplies the three-phase AC power to the spindle motor 1 in the normal operation period. Meanwhile, the rectification circuit 25 is an AC/DC converter. Though the direction of conversion is opposite, the SPM drive circuit 2 and the rectification circuit 25 are common in that they convert between three-phase AC power and DC power. In addition, the SPM drive circuit 2 operates only during the normal operation period, and the rectification circuit 25 operates only during the retraction period. In other words, these two circuits do not operate at the same time. In view of this, the fourth embodiment realizes the structurally common parts of the SPM drive circuit 2 and the rectification circuit 25 with a single circuit, to downsize a semiconductor chip.

(Overall Construction of a Magnetic Disk Drive)

A magnetic disk drive of the fourth embodiment differs from that of the second embodiment only in the SPM drive circuit and the rectification circuit. Accordingly, the following explanation focuses on the SPM drive circuit and the rectification circuit while omitting the other components.

Figure 10:
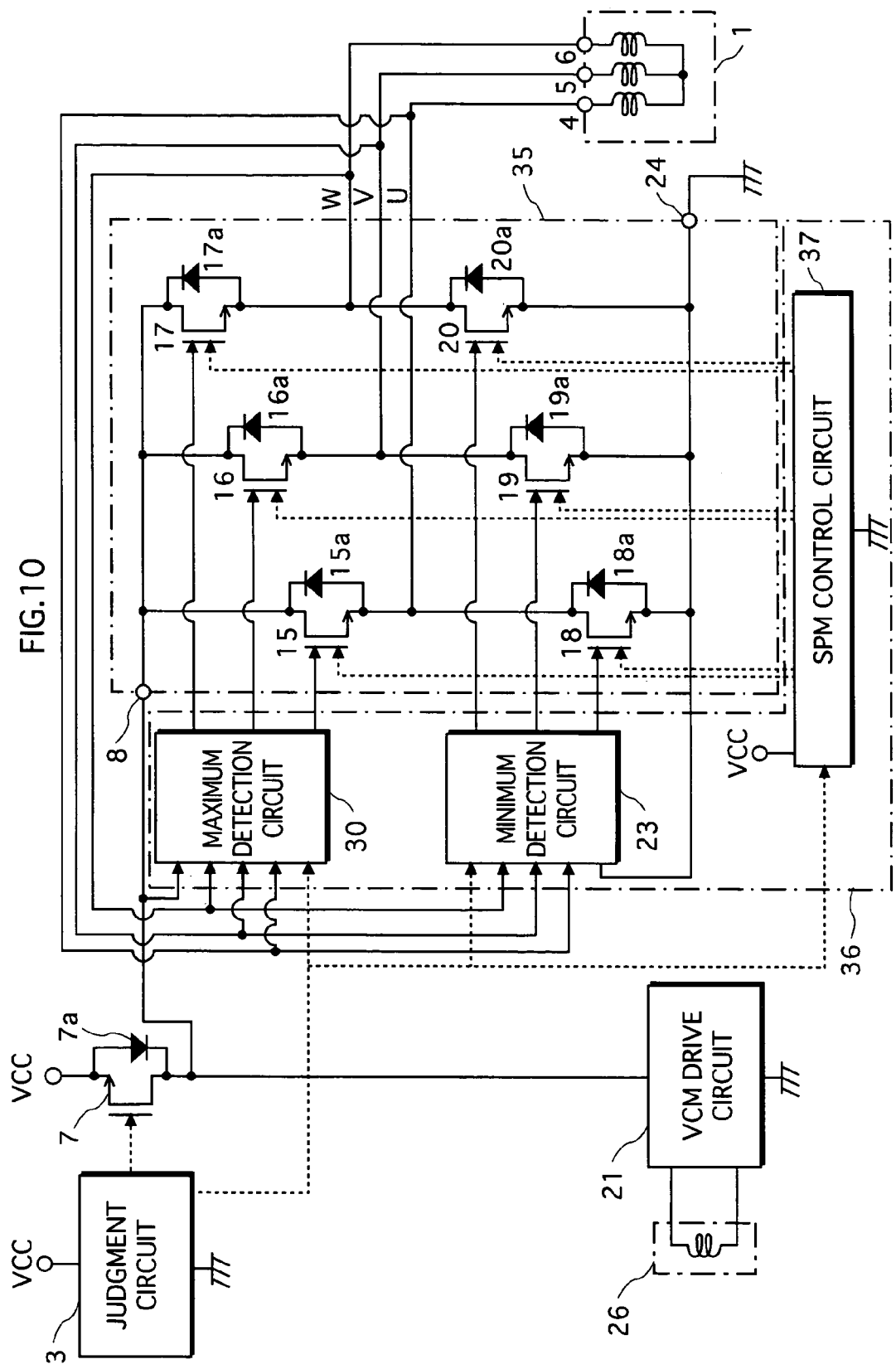
FIG. 10 shows a construction of a magnetic disk drive to which the fourth embodiment of the invention relates.

FIG. 10 shows a construction of the magnetic disk drive.

A conversion circuit 35 has the following functions. In the normal operation period, the conversion circuit 35 converts DC power of the power supply to three-phase AC power, and supplies the three-phase AC power to the spindle motor 1. In the retraction period, the conversion circuit 35 converts three-phase AC induced power of the spindle motor 1 to DC power, and supplies the DC power to the VCM drive circuit 21. The connection relationship of the switches 15 to 20 is the same as that in the second embodiment.

A control circuit 36 includes the maximum detection circuit 22, the minimum detection circuit 23, and a SPM control circuit 37.

The SPM control circuit 37 selectively applies a high and a low to each of the switches 15 to 20 to control the conversion circuit 35 to convert the power of the power supply from DC to three-phase AC, in the normal operation period. The SPM control circuit 37 outputs no signal to the switches 15 to 20 in the retraction period.

(Overall Operation of the Magnetic Disk Drive)

An overall operation of the magnetic disk drive having the above construction is explained below.

In the normal operation period, the switch 7 is closed. This being so, the DC power from the power supply is supplied to the VCM drive circuit 21 via the switch 7, and also to the conversion circuit 35 via the terminal 8. The conversion circuit 35 converts the DC power to three-phase AC power to drive the spindle motor 1, under control of the SPM control circuit 37.

In the retraction period, the conversion circuit 35 rectifies the induced power of the spindle motor 1 and supplies the rectified power to the VCM drive circuit 21, in the same way as the rectification circuit 25 of the second embodiment.

If chattering occurs during the retraction period, the same operation as in the second embodiment is performed.

As described above, by realizing the structurally common parts of the SPM drive circuit 2 and the rectification circuit 25 with a single circuit, a semiconductor chip can be downsized.

Modifications

The magnetic disk drive of the present invention has been described byway of the above embodiments, though it should be obvious that the invention is not limited to the above. Example modifications are given below.

(1) The first to fourth embodiments describe the case where the spindle motor 1 is a three-phase AC motor, but this is nota limit for the invention, which can equally be realized with a single-phase AC spindle motor.

(2) The first to fourth embodiments describe the case where full-wave rectification is performed, but half-wave rectification may instead be performed.

(3) The first to fourth embodiments describe the case where the switches 7 and 15 to 20 each use a double-diffused MOS transistor. However, the invention is not limited to such, so long as switching can be made according to a voltage applied to a control terminal. For example, a MOS transistor other than the double-diffused type, a bipolar transistor, or a thyristor may be used. Note here that it is advantageous to use a MOS transistor when integrating on a semiconductor chip, because a MOS transistor has a lower ON resistance than a bipolar transistor and so can be mounted on a semiconductor chip in a smaller size.

(4) The first embodiment describes an example construction of the step-up circuit 28 with reference to FIG. 5, but this can be modified as follows.

Figure 11:
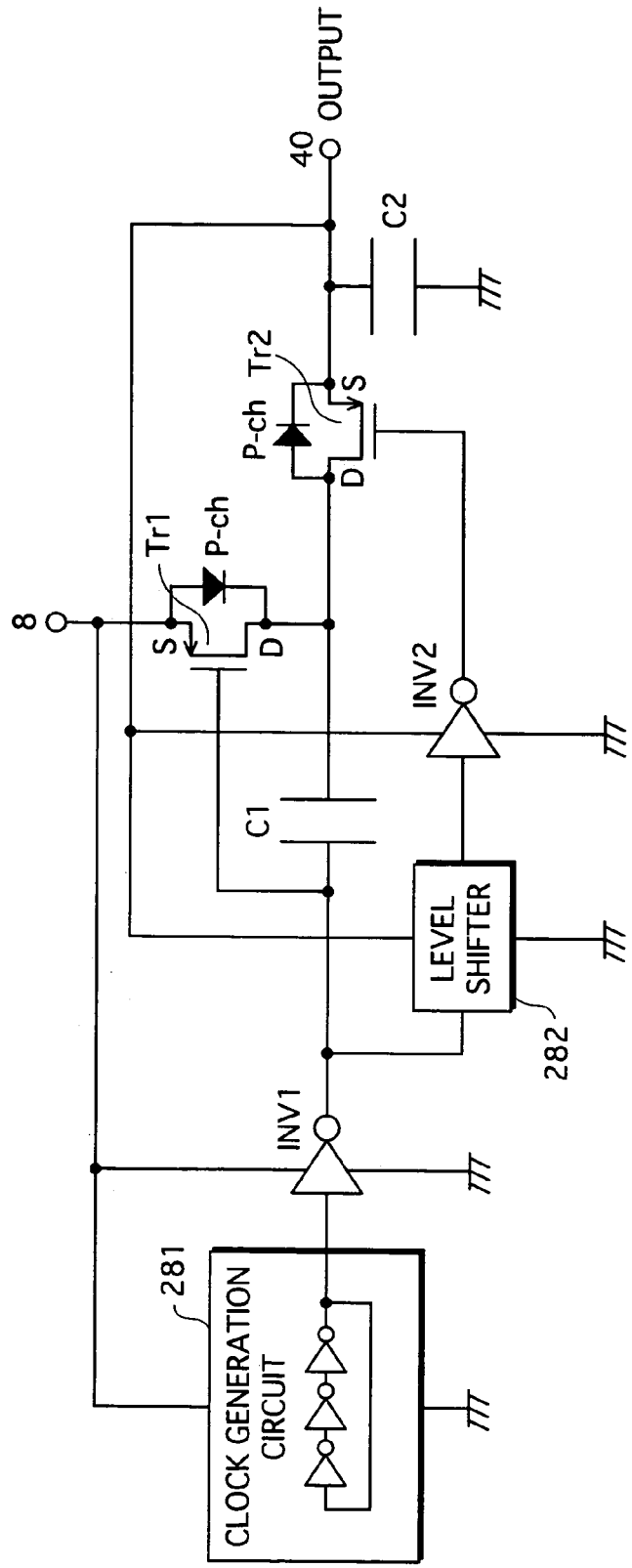
FIG. 11 shows a modification to the step-up circuit shown in FIG. 5.

FIG. 11 shows another example construction of the step-up circuit 28.

In the drawing, the diodes D1 and D2 in FIG. 5 have been replaced with p-channel MOS transistors Tr1 and Tr2.

A level shifter 282 increases an output signal in level, with respect to an input signal. This allows an inverter INV2 to operate reliably. The level shifter 282 outputs voltage V40 of the terminal 40 as a high, and a ground voltage as a low. Here, the output signal is in phase with the input signal. If the level shifter 282 has an inverter function and produces an output signal in opposite phase with an input signal, the inverter INV2 can be omitted.

To realize the transistor Tr1 as a discrete component, a diode is connected in parallel with the transistor Tr1. In this case, a sources of the transistor Tr1 is connected with an anode of the diode, and a drain D of the transistor Tr1 is connected with a cathode of the diode, as shown in FIG. 11. To integrate the transistor Tr1 in a semiconductor integrated circuit, on the other hand, a semiconductor substrate or a diffusion layer that is analogous to the semiconductor substrate is electrically connected with a drain diffusion layer. This produces an equivalent circuit in which a diode is connected in parallel with the transistor Tr1. The same applies to the transistor Tr2.

This step-up circuit operates in the following way.

The inverter INV1 inverts the clock signal in phase.

When the inverter INV1 outputs a low, the transistor Tr1 is closed. Accordingly, the capacitor C1 is charged by power from the terminal 8. A voltage drop caused by the ON resistance of the transistor Tr1 is about 0.3V, which is smaller than the forward voltage of the diode D1 (about 0.7V). Therefore, the charging voltage of the capacitor C1 is higher than that in FIG. 5. When the inverter INV1 outputs a low, the inverter INV2 outputs a high. Accordingly, the transistor Tr2 is opened. Hence a charge accumulated in the capacitor C2 does not flow back to the capacitor C1.

When the inverter INV1 outputs a high, the capacitor C1 discharges to the capacitor C2 through the transistor Tr2. During this time, the transistor Tr1 is opened. Therefore, the charge of the capacitor C1 does not flow back to the terminal 8. When the inverter INV1 outputs a high, the inverter INV2 outputs a low. Accordingly, the transistor Tr2 is closed. A voltage drop caused by the ON resistance of the transistor Tr2 is about 0.3V, which is smaller than the forward voltage of the diode D2 (about 0.7V). Therefore, the charging voltage of the capacitor C2 is higher than that in FIG. 5.

Thus, the step-up circuit shown in FIG. 11 has a higher step-up ability than the one shown in FIG. 5, and so can be effectively used when power is limited as in the retraction period.

As an alternative, the following construction may be employed for downsizing.

Figure 12:
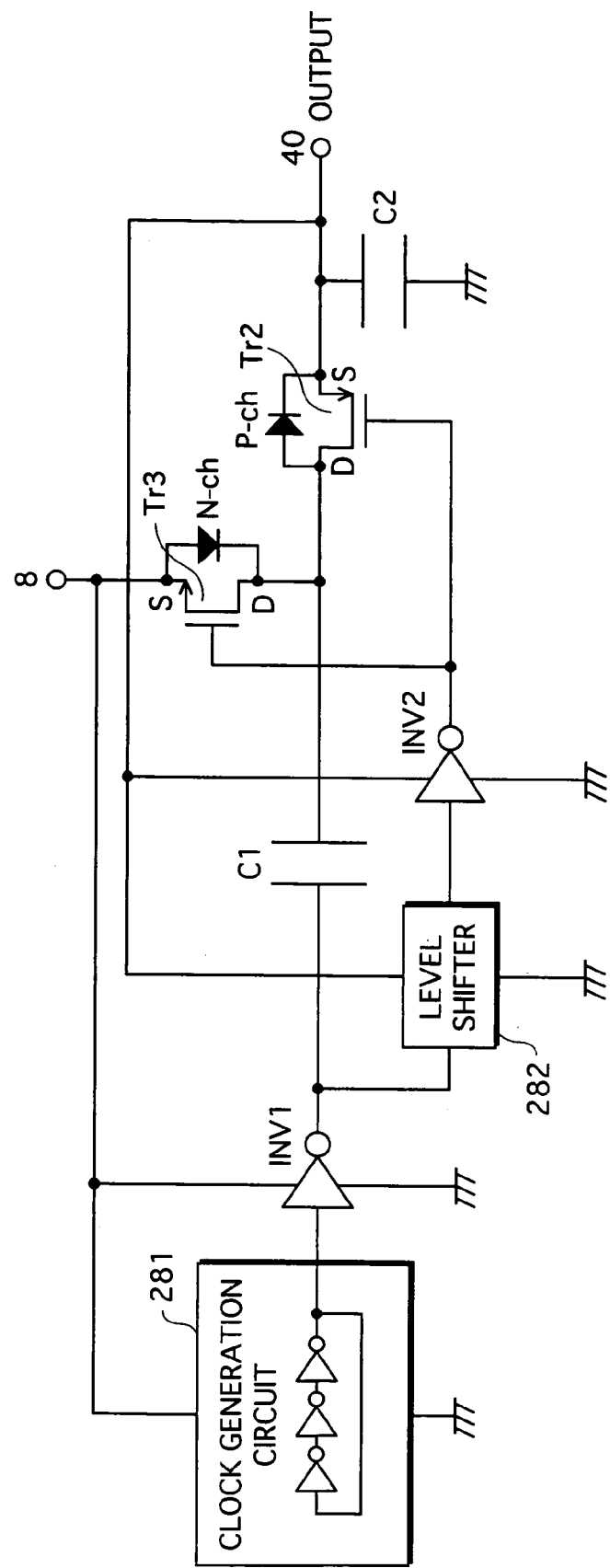
FIG. 12 shows another modification to the step-up circuit shown in FIG. 5.

FIG. 12 shows another example construction of the step-up circuit 28.

In the drawing, the transistor Tr1 in FIG. 11 has been replaced with an n-channel MOS transistor Tr3.

In general, an n-channel MOS transistor has double to triple a current-carrying capacity of a p-channel MOS transistor. This being so, the use of an n-channel MOS transistor allows the entire chip area of a semiconductor integrated circuit to be reduced. When the chip area is smaller, the unit price of a chip is reduced, which contributes to a lower cost.

To realize the n-channel MOS transistor Tr3 as a discrete component, a diode is connected in parallel with the transistor Tr3. In this case, a source S of the transistor Tr3 is connected with an anode of the diode, and a drain D of the transistor Tr3 is connected with a cathode of the diode, as shown in FIG. 12. To integrate the transistor Tr3 in a semiconductor integrated circuit, on the other hand, a semiconductor substrate or a diffusion layer that is analogous to the semiconductor substrate is electrically connected with a source diffusion layer. This produces an equivalent circuit in which a diode is connected in parallel with the transistor Tr3.

The transistor Tr3 is not closed unless a voltage higher than a source voltage is applied to a gate. In other words, the transistor Tr3 is controlled by the output of the inverter INV2.

It should be noted that the transistor Tr2 cannot be replaced with an n-channel MOS transistor that requires a gate voltage higher than a source voltage, unlike the transistor Tr1.

This step-up circuit operates in the following way.

The inverter INV1 inverts the clock signal in phase.

When the inverter INV1 outputs a low, the inverter INV2 outputs a high. Accordingly, the transistor Tr3 is closed. This being so, the capacitor C1 is charged by power from the terminal 8. A voltage drop caused by the ON resistance of the transistor Tr3 is about 0.3V, which is smaller than the forward voltage of the diode D1 (about 0.7V). Therefore, the charging voltage of the capacitor C1 is higher than that in FIG. 5. When the inverter INV1 outputs a low, the inverter INV2 outputs a high. Accordingly, the transistor Tr2 is opened. Hence a charge accumulated in the capacitor C2 does not flow back to the capacitor C1.

When the inverter INV1 outputs a high, the capacitor C1 discharges to the capacitor C2 through the transistor Tr2. During this time, the transistor Tr3 is opened. Therefore, the charge of the capacitor C1 does not flow back to the terminal 8. When the inverter INV1 outputs a high, the inverter INV2 outputs a low. Accordingly, the transistor Tr2 is closed. A voltage drop caused by the ON resistance of the transistor Tr2 is about 0.3V, which is smaller than the forward voltage of the diode D2 (about 0.7V). Therefore, the charging voltage of the capacitor C2 is higher than that in FIG. 5.

This step-up circuit cannot bring the transistor Tr3 into full conduction in the beginning of the operation where output voltage V40 is not yet sufficiently stepped-up. Therefore, the capacitor C1 receives power through the diode connected in parallel with the transistor Tr3 in the beginning of the operation. This causes a lower step-up ability of the step-up circuit. However, output voltage V40 becomes sufficiently stepped-up with the passage of time, which brings the transistor Tr3 into full conduction. Hence the step-up ability of the step-up circuit increases.

Even though the step-up ability is initially low, the step-up circuit operates from the normal operation period so that output voltage V40 is sufficiently stepped-up by the time the magnetic head need be retracted. Hence this does not cause a disadvantage to practical use.

(5) The first embodiment describes the case where a ring oscillator is used as the clock generation circuit 281, but the invention is not limited to such, so long as a clock signal can be generated stably with a low voltage.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A magnetic disk drive having an automatic head retract mechanism, comprising:
    a judgment circuit operable to judge whether a power supply voltage is below a predetermined level;
    a switch inserted in a connecting line between a coil of a motor for rotating a magnetic disk and a power terminal of an actuator for driving a magnetic head, and closed or opened depending on a voltage applied to a control terminal thereof;
    a step-up circuit inserted in a connecting line between the power terminal of the actuator and the control terminal of the switch, and operable to step-up a voltage of power supplied to the power terminal of the actuator, thereby obtaining a voltage to be applied to the control terminal of the switch; and
    a switch control unit operable to, when the judgment circuit judges that the power supply voltage is below the predetermined level, close the switch by applying the voltage obtained by the step-up circuit to the control terminal of the switch, to supply induced power generated in the motor to the power terminal of the actuator.

2. The magnetic disk drive of claim 1,
    wherein the step-up circuit includes:
    a capacitor;
    a clock generation circuit operable to generate a clock signal that alternates between a high level and a low level at regular intervals, and output the clock signal to a first terminal of the capacitor; and
    a step-up control circuit operable to apply the voltage of the power supplied to the power terminal of the actuator to a second terminal of the capacitor when the clock signal is the low level, and output a voltage from the second terminal of the capacitor when the clock signal is the high level.

3. The magnetic disk drive of claim 2, wherein the clock generation circuit is a ring oscillator formed by a predetermined number of cascaded inverters, the predetermined number being an odd number no less than 3, where an output voltage of a last inverter is output as the clock signal and also input to a first inverter as an input voltage.

4. The magnetic disk drive of claim 1,
    wherein the switch is a MOS transistor, with a source connected to the coil of the motor and a drain connected to the power terminal of the actuator, and
    the switch control unit (a) applies the voltage obtained by the step-up circuit to a gate of the MOS transistor to produce conduction between the source and the drain when the judgment circuit judges that the power supply voltage is below the predetermined level, and (b) refrains from applying the voltage obtained by the step-up circuit to the gate of the MOS transistor to prevent conduction between the source and the drain when the judgment circuit judges that the power supply voltage is equal to or above the predetermined level.

5. A magnetic disk drive having an automatic head retract mechanism, comprising:
    a judgment circuit operable to judge whether a voltage of a power supply is below a predetermined level;
    a plurality of switches which are each inserted in a connecting line between a different one of the coils of a three-phase alternating-current motor for rotating a magnetic disk and a power terminal of an actuator for driving a magnetic head, the coils corresponding to different phases;

a step-up circuit inserted in a connecting line between the power terminal of the actuator and the control terminal of each of the plurality of switches, and operable to step-up a voltage of power supplied to the power terminal of the actuator, thereby obtaining a voltage to be applied to the control terminal of any of the plurality of switches; and a specification circuit operable to specify a highest voltage out of motor-side voltages for the plurality of switches; and a control circuit operable to, when the judgement circuit judges that the voltage of the power supply is below the predetermined level, apply the voltage obtained by the step-up circuit to a control terminal of a switch specified by the specification circuit to close the switch, to rectify induced power generated in the three-phase alternating-current motor and supply the rectified power to the power terminal of the actuator.

6. The magnetic disk drive of claim 5,
wherein the specification circuit detects the motor-side voltages and actuator-side voltages for the plurality of switches, and specifies a highest voltage out of the detected voltages, and
the control circuit opens, if the highest voltage is an actuator-side voltage of any of the plurality of switches, all of the plurality of switches.

7. The magnetic disk drive of claim 5,
wherein each of the plurality of switches is a MOS transistor, with a source connected to a different one of the coils of the three-phase alternating-current motor and a drain connected to the power terminal of the actuator.

8. The magnetic disk drive of claim 5, wherein power supplied from the power supply is direct-current power, and when the judgment circuit judges that the voltage of the power supply is equal to or above the predetermined level, the control circuit selectively closes the plurality of switches to convert the direct-current power from the power supply to three-phase alternating-current power and supply the three-phase alternating-current power to the three-phase alternating-current motor, to have the three-phase alternating-current motor rotate the magnetic disk.

9. A magnetic disk drive having an automatic head retract mechanism, comprising:

a judgment circuit operable to judge whether a voltage of a power supply is below a predetermined level;

a plurality of switches which are each inserted in a connecting line between a different one of the coils of a three-phase alternating-current motor for rotating a magnetic disk and a power terminal of an actuator for driving a magnetic head, the coils corresponding to different phases;

a comparison circuit operable to compare a motor-side voltage and an actuator-side voltage for each of the plurality of switches; and a control circuit operable to, when the judgement circuit judges that the voltage of the power supply is below the predetermined level, close the switch if the comparison circuit judges that the motor-side voltage is higher than the actuator-side voltage, and open the switch if the comparison circuit judges that the motor-side voltage is no higher than the actuator-side voltage, to rectify induced power generated in the three-phase alternating-current motor and supply the rectified power to the power terminal of the actuator.

\* \* \* \* \*